United States Patent
Behle et al.

(10) Patent No.: US 7,744,790 B2
(45) Date of Patent: Jun. 29, 2010

(54) METHOD AND DEVICE FOR THE SIMULTANEOUS COATING AND MOULDING OF A BODY

(75) Inventors: Stephan Behle, Hahnheim (DE); Markus Kuhr, Wöllstein (DE); Marten Walther, Engelstadt (DE); Detlef Wolff, Mainz (DE); Matthias Bicker, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/485,979

(22) PCT Filed: Aug. 7, 2002

(86) PCT No.: PCT/EP02/08851

§ 371 (c)(1),
(2), (4) Date: Aug. 3, 2004

(87) PCT Pub. No.: WO03/013738

PCT Pub. Date: Feb. 20, 2003

(65) Prior Publication Data

US 2004/0245667 A1 Dec. 9, 2004

(30) Foreign Application Priority Data

Aug. 7, 2001 (DE) .............................. 101 38 696

(51) Int. Cl.
*B29C 51/10* (2006.01)
(52) U.S. Cl. .......................... 264/83; 264/84; 264/500; 264/328.1; 425/529
(58) Field of Classification Search ............... 264/328.7, 264/83
See application file for complete search history.

(56) References Cited

U.S. PATENT DOCUMENTS

| 4,114,369 | A | * | 9/1978 | Crowley ..................... 60/200.1 |
| 4,265,730 | A | * | 5/1981 | Hirose et al. ............ 204/298.38 |
| 4,880,675 | A | * | 11/1989 | Mehta ........................ 428/35.7 |
| 5,378,510 | A | * | 1/1995 | Thomas et al. .............. 427/563 |
| 5,458,480 | A | * | 10/1995 | Newkirk et al. ............. 425/547 |
| 5,560,963 | A | * | 10/1996 | Tisack ......................... 427/489 |
| 5,798,139 | A |   | 8/1998 | Nagashima et al. ......... 427/237 |
| 5,833,752 | A |   | 11/1998 | Martin ....................... 118/723 |
| 6,001,429 | A |   | 12/1999 | Martin ....................... 427/536 |
| 6,565,791 | B1 | * | 5/2003 | Laurent ....................... 264/455 |

FOREIGN PATENT DOCUMENTS

| DE | 195 02 103 A1 | 8/1995 |
| EP | 1 029 648 A2 | 8/2000 |
| EP | 1 029 648 A3 | 7/2002 |
| JP | 62130823 | 6/1987 |
| WO | WO 99/17334 | 4/1999 |

* cited by examiner

*Primary Examiner*—Monica A Huson
(74) *Attorney, Agent, or Firm*—Ohlandt, Greeley, Ruggiero & Perle, L.L.P.

(57) ABSTRACT

A process for simultaneously coating and forming a body. The process includes moving two mold halves into contact with one another; introducing an injection-molding material into the mold halves so that a molding is formed; evacuating the molding; admitting a gas into the molding; igniting a plasma in the molding so that a coating is deposited on the inner side of the molding; and moving the mold halves apart so that the molding drops out.

16 Claims, 7 Drawing Sheets

METHOD AND DEVICE FOR THE SIMULTANEOUS COATING AND MOULDING OF A BODY

BACKGROUND OF THE INVENTION

1. Field of the Invention

The invention relates to a process and an apparatus for coating and forming a body and to a body produced thereby.

2. Description of Related Art

To reduce the permeation of gases and liquids in the field of plastic packaging and to protect the plastic material from chemical attack or UV radiation, it is advantageous for substrate materials, in particular three-dimensional hollow bodies, to be provided with a coating, in particular a barrier coating. Coatings allow the same property to be achieved with inexpensive bulk plastics as with expensive specialty plastics and make it possible to replace glass, for example, in the field of pharmaceutical packaging materials with bulk plastics of this type. Applications of coatings to a plastic substrate have been disclosed by the following applications:

U.S. Pat. No. 5,798,139
U.S. Pat. No. 5,833,752
U.S. Pat. No. 6,001,429

U.S. Pat. No. 5,798,139 describes the production of plastic containers with a carbon film coating. The carbon film is intended to form a gas barrier and to solve the problem of sorption from the plastic material.

U.S. Pat. No. 5,833,752 has disclosed a system in which the barrier coating is applied from a plasma. The energy used to maintain the plasma is applied by devices which are distinguished by the fact that the energy is introduced into the interior of the containers to be coated via an outer electrode.

is U.S. Pat. No. 6,001,429 again discloses the application of a barrier layer to the inner surface of a plastic substrate, with HMDSO as monomer gas together with an oxygen carrier gas being passed into the interior of the item which is to be coated.

WO 99/17334 has disclosed a process for internal or external coating, in which a coating apparatus for coating a plastic container has been combined with a stretch blow molding device. A drawback of the apparatus which is known from WO 99/17334 is that it is in each case only possible to produce one hollow body per coating station. A further drawback is that the apparatus which is known from WO 99/17334 cannot be used to produce bodies of any desired shape.

SUMMARY OF THE INVENTION

Therefore, it is an object of the invention to provide a process and an apparatus which allow bodies of any desired shape to be produced.

According to the invention, the object is achieved by a process in which in each case two mold halves of a mold for forming a body are moved together and brought into contact with one another, the mold halves preferably being electrically insulated from one another by a voltage-proof covering. An injection-molding material is to introduced into the mold halves which have been moved together, so that a molding is formed. Then, in a first embodiment of the invention, once the mold halves have been moved together and protected from short circuits, the interior of the molding can be evacuated, then filled with gas comprising a gas atmosphere and a precursor gas, and plasma can be ignited, for example using HF AC voltage, in order for the inner side of the molding to be coated.

In an alternative embodiment, for example in order for a simultaneous outer coating to be applied to the molding or moldings, the mold halves can be moved back a predetermined distance, so that a vacuum chamber is formed. The vacuum chamber and/or the molding are then evacuated and a gas is admitted to the evacuated vacuum chamber formed by the mold halves and the molding and/or to the molding itself. Then, the plasma is ignited in the vacuum chamber and/or the molding, so that a coating is deposited on the outer and/or inner side of the molding. Once the coating step has ended, the mold halves are moved apart, so that the molding drops out. This embodiment of the invention is suitable not only for internal and external coating of a hollow body, but rather may equally well be used for the external coating of a solid body, such as for example a part of a casing or optical elements, such as an optical lens or a transparent cover, for example a display cover.

In a preferred embodiment of the invention, a layer of mica, quartz or Teflon is provided for electrical insulation in the region in which the two mold halves come into contact in the moved-together state, so that a short circuit between the two mold halves is avoided when a voltage is applied, for example in order to generate an HF field. It is preferable for one mold half of the mold to form the cathode and one mold half of the mold to form the anode. In addition to excitation by means of a high-frequency AC field, it is also possible for the plasma to be ignited using microwaves which have been introduced via waveguide structures. In addition to the process, the invention also provides an apparatus for simultaneously coating and forming a body.

An apparatus of this type comprises a mold for forming a molding, a feed line for feeding an injection-molding material into the mold, a feed line for evacuating the vacuum chamber formed in the mold and/or the molding, and a feed line for feeding gas into the vacuum chamber and/or the molding, as well as means for igniting the gas which has been fed into the vacuum chamber and/or the molding.

The apparatus according to the invention for simultaneous injection-molding and coating is not restricted to an apparatus comprising two mold halves. An embodiment with two mold halves as used in the process according to the invention is merely one preferred embodiment.

Moldings which are produced using an apparatus according to the invention comprise one or more of the following materials:

glass, polycyclic hydrocarbons, polycarbonates, polyethylene terephthalates, polystyrene, polyethylene, in particular HDPE, polypropylene, polymethyl methacrylate, PES. In particular, it is possible for polycyclic hydrocarbons, such as COC, which themselves already form a high-density barrier plastic, to be coated in such a manner that this high-density barrier plastic is protected from attack by organic substances, in particular by fats or greases.

In a preferred embodiment, the thickness of the barrier coating is <1000 nm, preferably <300 nm. In addition to good barrier properties, barrier layers of this type are also highly flexible. Furthermore, with such thin layers it is in particular also possible to avoid intrinsic stresses which can cause the barrier layer to flake off. In a particularly preferred embodiment, the barrier layer has still further additional functions, for example optical or electrical functions or nonscratch or antireflection functions. In addition to providing a barrier action against gases and/or liquids, in particular against $O_2$, $CO_2$, $H_2O$, water vapor, the coating may also have a barrier function against fats and greases and decomposition products thereof, in order, for example, to protect sensitive plastic substrates.

The ignition of the plasma, for example by means of HF or microwave, generates a plasma, with the result that precursor gases of a gas atmosphere which are introduced into the 3D molding or the evacuated space between the mold halves react and a coating is deposited on the 3D molding. Transparent layers result if the following precursor materials are used: HMDSN, HMDSO, PMS, silane in $N_2$, $TiCl_4$ in an atmosphere comprising $O_2$, $N_2$, $N_2+NH_3$. Materials of this type make it possible to deposit $TiO_2$, $SiO_2$ and $Si_xN_y$ layers on various plastics materials. A $TiO_2$ layer is deposited, for example, if a $TiCl_4$ precursor gas in an $O_2$ atmosphere is used, an $SiO_2$ barrier layer is formed from an HMDSN precursor gas in an $O_2$ atmosphere, and an Si—N barrier layer is formed if a $SiH_4$ or TMS precursor in an $N_2+NH_3$ atmosphere is used.

The invention also relates to a process for simultaneously coating and forming a body. In this case, first of all a parison is produced, for example using the injection-molding process. The parison is then fully molded in the injection blow molding process. Then, the hollow body and/or a vessel which surrounds the body is filled with a gas and a plasma is ignited in the hollow body and/or the outside space between vessel and hollow body, so that a coating is deposited on the inner side and/or the outer side of the hollow body. This process relates to the coating during the injection blow molding process, in which the hollow body which is to be formed is not poured into a mold, but rather is shaped out of a parison in a blow mold, in a single operation. In this process too, the subsequent coating in accordance with the invention can be carried out in a single operation. This process is also suitable for injection stretch blow molding, in which the parison is additionally stretched lengthways by a mandrel. If the body is surrounded by a vessel, the latter can also be filled with a gas and a plasma ignited on the outer side of the body. This also makes it possible to coat the outer side. It is also conceivable for the external and internal coating to be carried out in two steps. This allows a different coating to be formed on the outer side from the inner side.

The invention also relates to a process for simultaneously coating and forming a body, comprising the steps of: filling a mold with molten material, expelling excess molten material by means of gas or liquid, evacuating the hollow body which has formed, filling the hollow body and/or a vessel which surrounds the body with a gas and igniting a plasma in the molding and/or vessel, so that a coating is deposited on the inner side and/or outer side of the molding. This process according to the invention in turn allows a body to be simultaneously coated and molded and is aimed at the gas-assisted injection molding process. In this case, to produce the body, molten material is injected into a mold. The excess molten material is forced out by means of a gas, so that a hollow body is formed. A liquid is also a conceivable alternative to a gas. Then, the hollow body which has been formed in this way is evacuated and filled with the gas or gas mixture intended for the coating. It is also conceivable for the excess molten material to be forced out simply by the gas or gas mixture intended for the coating. The process relates to all embodiments of the gas-assisted injection molding process, in particular the blow-out process, the mass back pressure process and the core-pulling process. Processes of this type are described, for example, in "Gasinnendruckprozess ist mehr als eine Alternative" [Gas-assisted injection molding process is more than one alternative], Klaus Rahnhöfer, Kunststoffberater 9/96, 24-27, the content of disclosure of which is hereby incorporated in its entirety in the subject matter of the present invention.

Microwaves are preferably used to generate the plasma. In this context, it is particularly preferable to use microwaves with a frequency of 2.45 GHz. However, lower frequencies may also be advantageous for certain applications. By way of example, frequencies in the high-frequency or radio frequency range may be advantageous if the mold parts of the apparatus are used as radiating elements, so that an alternating field is built up between them.

In one embodiment of the invention, the plasma is ignited by a high-frequency AC voltage, preferably at 13.56 MHz. The frequency of 13.56 MHz is a German post office licensed frequency and is therefore preferred.

According to one refinement of the invention, the HF AC voltage or the microwaves is/are introduced by means of an antenna positioned in the hollow body. In this way, a substantially cylinder-symmetrical field is generated in the hollow body. This allows a uniform coating to be produced.

Furthermore, it is preferable for the microwaves or high-frequency AC voltage to be pulsed. In this way, the thermal load on the substrate to be coated is reduced, and in particular gas exchange is made possible between the pulses, so that especially clean coatings can be produced using pulsed fields.

In yet a further refinement of the invention, the AC voltage introduced and/or the microwaves introduced is/are controlled in such a way that a coating is formed substantially only at the wall of the body, in accordance with the higher field intensity which is present there. This is possible with an antenna which is positioned in the center of the body with the field strength generated by the HF AC voltage decreasing in the radial direction. For example, the gas discharge can be controlled in such a way that a coating is formed only on the inner and/or outer side of the hollow body. This has the advantage that the installation is not contaminated by the coating.

In an expedient embodiment of the invention, the mold has at least one ejector element, which for its part includes a passage for the introduction of process gas and/or microwaves. Ejector elements are used in injection molding to eject the part which has been produced and may stick to the mold or holder. A passage through which process gas and/or microwaves can be introduced is provided at the ejector element according to the invention. This allows components which are required for the coating to be integrated in an existing component of an injection molding installation.

In one expedient embodiment of the invention, the mold has at least one window, preferably a glass window, for introduction of the HF and/or microwave energy.

The invention is to be explained in more detail below on the basis of the exemplary embodiments and the figures, in which:

DETAILED DESCRIPTION OF THE INVENTION

Figure 1:
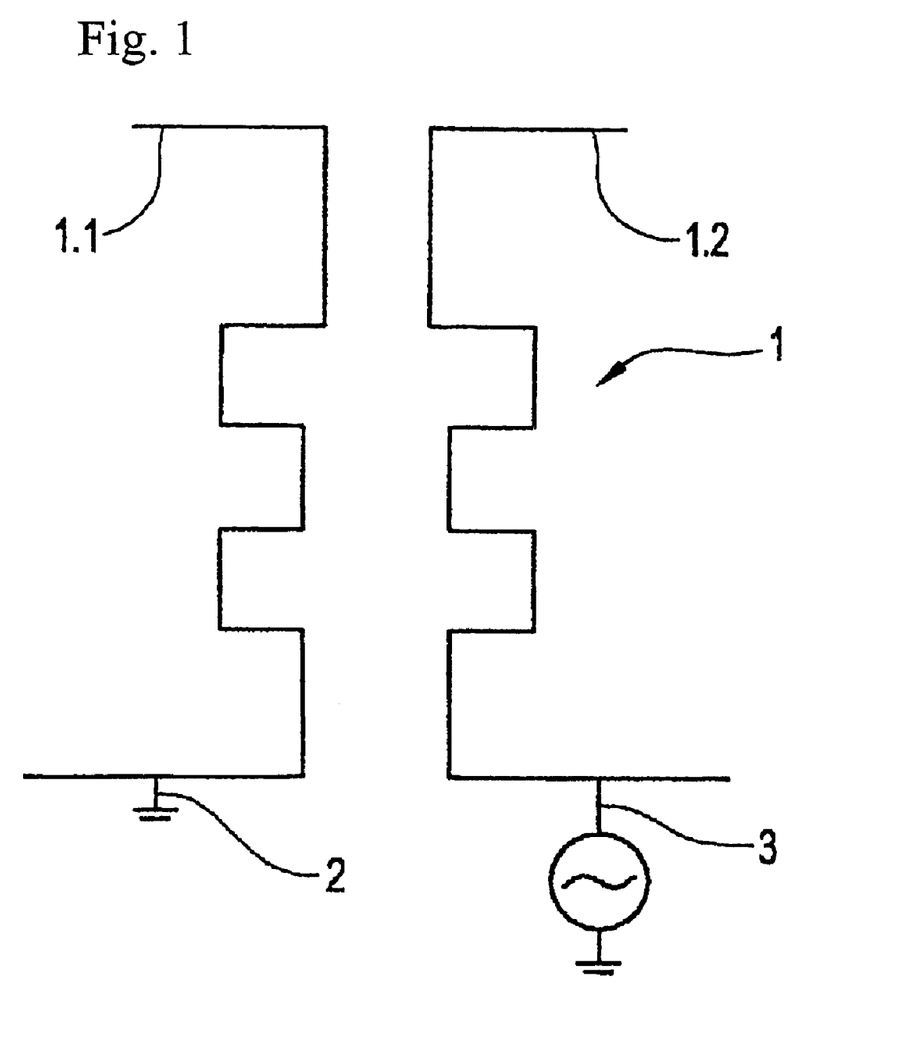
FIG. 1 shows the two mold halves of the mold in their moved-apart position.

FIG. 1 shows a mold 1 according to the invention which comprises two mold halves 1.1 and 1.2. If, in one embodiment of the invention, to excite the plasma one mold half 1.1 of the mold is connected as an anode and ground potential 2 is applied, the other mold half is connected as a cathode, to which a high-frequency alternating field 3 can be applied.

In a first process step, the two mold halves 1.1 and 1.2 are moved toward one another, so that they come into contact with one another in the upper region 5 and a passage 8, into which injection-molding material, for example a plastic material, such as polyethylene, etc., is introduced, is formed in the lower region 7 of the mold 1. To prevent a short circuit between the mold halves when an AC voltage is applied in order to generate a plasma, an electrical insulator material, such as for example mica, quartz or Teflon, is applied in the upper region 5 of the mold half in which the mold halves come into contact with one another.

Figure 2:
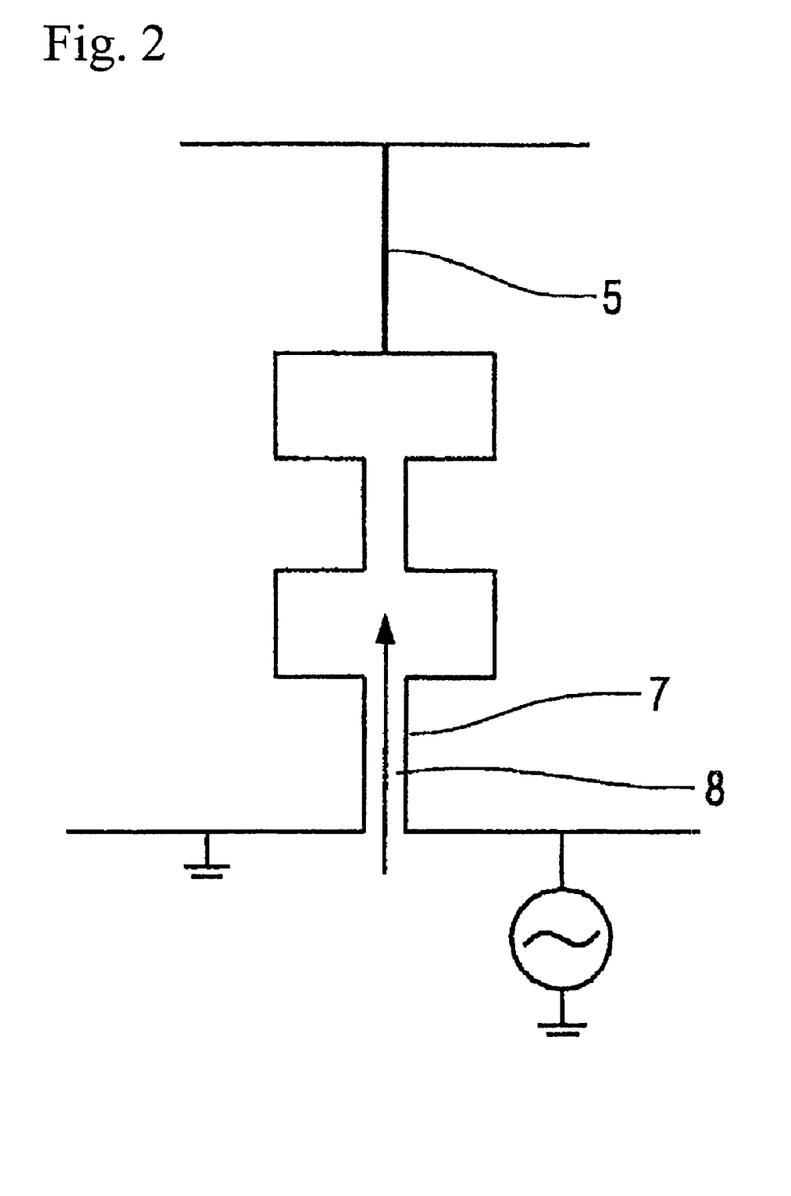
FIG. 2 shows the two mold halves of the mold in the moved-together position with an inlet for the injection-molding material.
Figure 3:
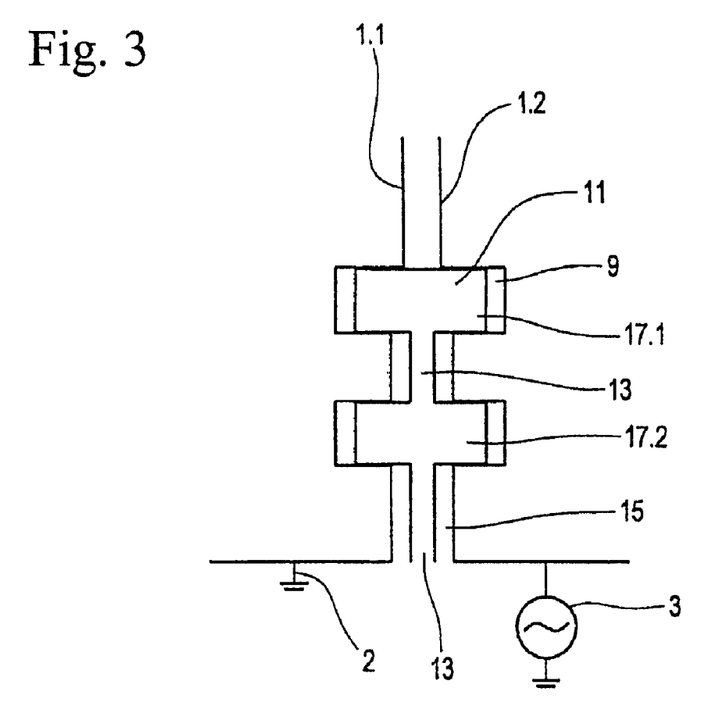
FIG. 3 shows the mold in the moved-apart position such that a vacuum chamber is formed.

After the injection-molding material has been introduced into the mold halves 1.1, 1.2 which have been moved together as shown in FIG. 2 and a plastic molding has been formed, in a first embodiment of the invention, which also allows external coating of the molding, the mold halves 1.1 and 1.2 can be moved apart, as shown in FIG. 3, by a predetermined distance x. In this way, a vacuum chamber 9 is formed around the molding. Of course, the molding 11 itself likewise forms a vacuum chamber. The sprue 13 of the moldings in the inlet section 7 itself serves as a feed line into the interior of the moldings. A further space 15, which can be used as an inlet for gases or a gas atmosphere into the vacuum space 9, is also opened up around the sprue.

To produce an internal coating, a gas mixture consisting of atmosphere gas and a precursor gas is passed into the interior of the moldings via the sprue 13.

The precursor gases may comprise HMDSN, HMDSO, TMS, silane in $N_2$, $TiCl_4$. Conceivable gas atmospheres include an $O_2$ atmosphere, an $N_2$ atmosphere or an $N_2+NH_3$ atmosphere.

In addition to gases of this type being introduced into the interior of the two moldings 17.1 and 17.2 shown here by way of example, it is also possible for the space 9 which is created by the mold parts being pulled apart and is located outside the moldings to be filled with a gas atmosphere and a precursor gas. If a high-frequency AC voltage is then applied to the AC voltage source 3, as shown in FIG. 1, a plasma is ignited in the interior and, if gas and precursor gas are also present in the space 9, in the space outside the moldings. The plasma may be a pulsed plasma or a continuous plasma. With regard to pulsed plasmas, which serve as the basis for what are known as PICVD coating processes, reference is made to DE 38 30 249 C2, the content of disclosure of which is hereby incorporated in its entirety in the present application. The container is provided with a coating on the inside and optionally also on the outside, for example an $SiO_x$ coating, a $TiO_x$ coating, an $SNO_x$ coating or an $Si_xN_y$ coating, preferably with a thickness in the range from 10-1000 nm, with the aid of the continuous plasma or a pulsed plasma. The coating which has been applied to the plastic molding can be used as a barrier coating, for example an oxygen barrier coating.

In the case of just an internal coating, it is not necessary for the mold to be pulled apart as illustrated in FIG. 3, so that a vacuum chamber 9 is formed around the molding. Rather, with the mold still in its moved-together position, as shown in FIG. 2, in which the mold halves bear directly against the moldings 17.1 and 17.2, precursor gas and gas plasma which form the gas atmosphere can be introduced into the interior of the moldings via the sprue 13. On account of the insulation between the two mold halves, a plasma can then be ignited, for example with the aid of high-frequency energy, so that a coating is deposited on the inner side of the molding.

After the molding has been coated, the mold is pulled completely apart and the mold parts are removed from molding.

Figure 4:
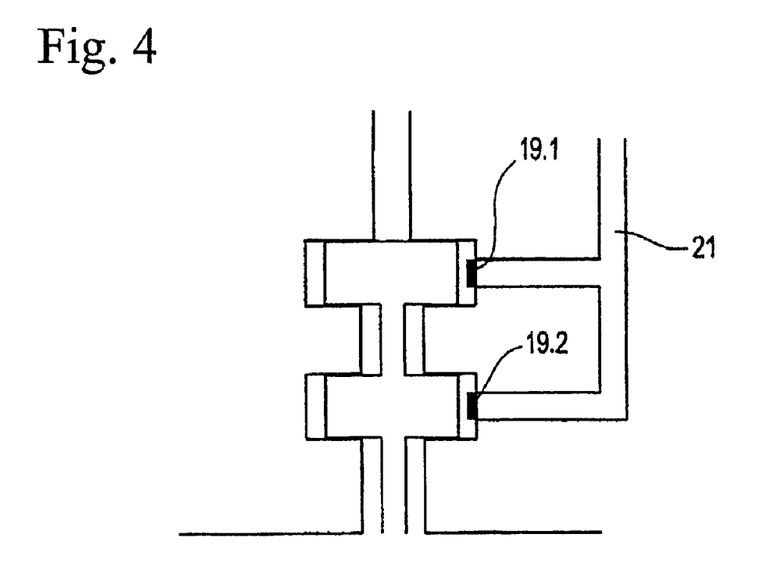
FIG. 4 shows an alternative embodiment to an arrangement shown in FIG. 1, in which the plasma is excited with the aid of microwave energy, FIG. 5 diagrammatically depicts an embodiment with an antenna which is introduced into the hollow body in order to introduce HF AC voltage, FIG. 6 diagrammatically depicts an embodiment with ejector elements which have a passage for the introduction of process gas.

As an alternative to coating using high-frequency (HF) energy, it would also be possible to ignite the plasma with the aid of microwave energy. An apparatus for a coating operation of this type is shown in FIG. 4.

Identical components to those shown in FIG. 3 are provided with the same numerals. The microwave energy is introduced from the side of the mold half 1.2 via the electrical windows 19.1, 19.2 of a semiconductor structure 21 or via antenna structures.

Figure 5:
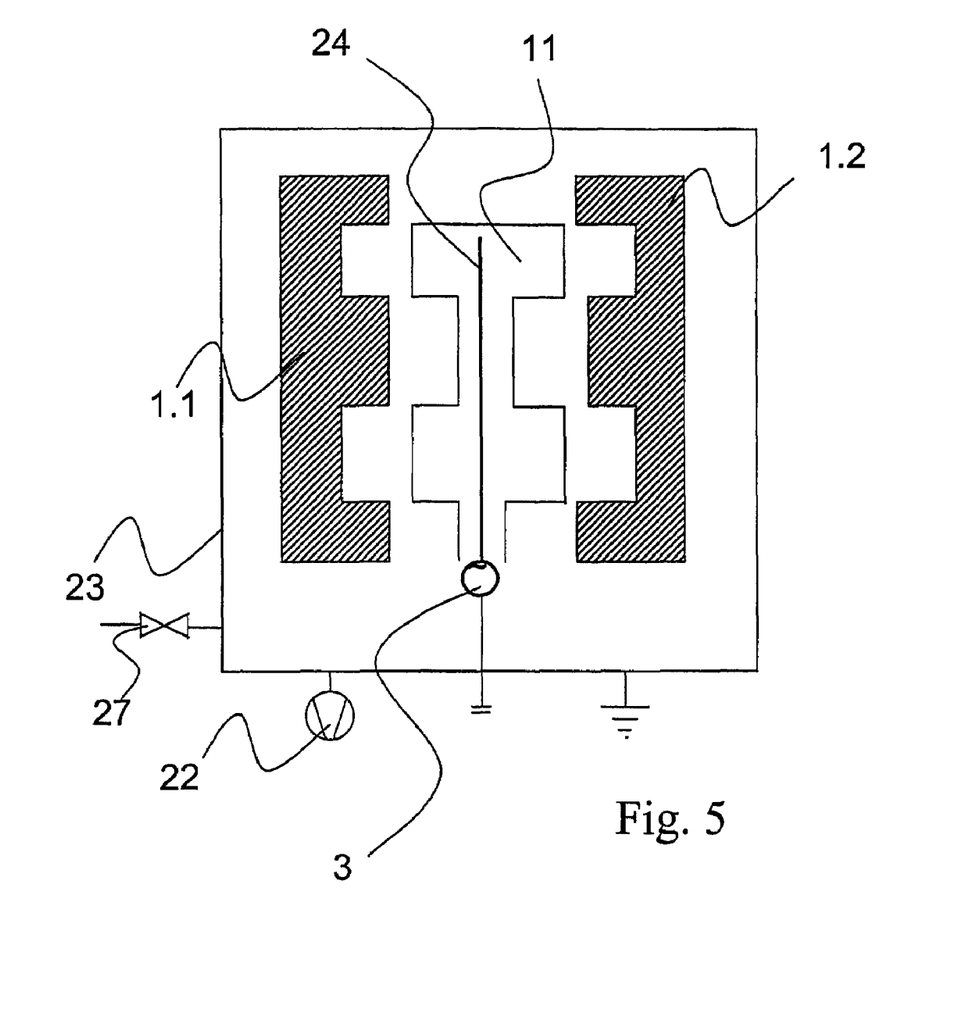

FIG. 5 diagrammatically depicts an embodiment with an antenna 24 for introducing HF AC voltage into the hollow body. The molding 11 is produced by a liquid melt being introduced into the mold 24. Excess melt is released or forced out by introduction of a gas or a liquid. A hollow body 11 is formed as a result of the subsequent cooling. Then, the mold 1.1, 1.2 can be moved away from the body 11. A container 23 which surrounds the body 11 and the mold 22 can be evacuated by means of a pump 22 and refilled again via a valve 27. In this way, a gas is introduced into the container. Ignition of a plasma by means of an AC voltage 3 applied to the antenna 24 allows the body 11 to be coated. On account of the fact that the field decreases substantially radially from the inside outward, it is possible for the formation of the plasma to be controlled in such a way that a coating is formed only on the inner side and/or outer side of the body 11, whereas the mold 1.2, 1.2 is at most slightly contaminated or is not contaminated at all by the coating.

Figure 6:
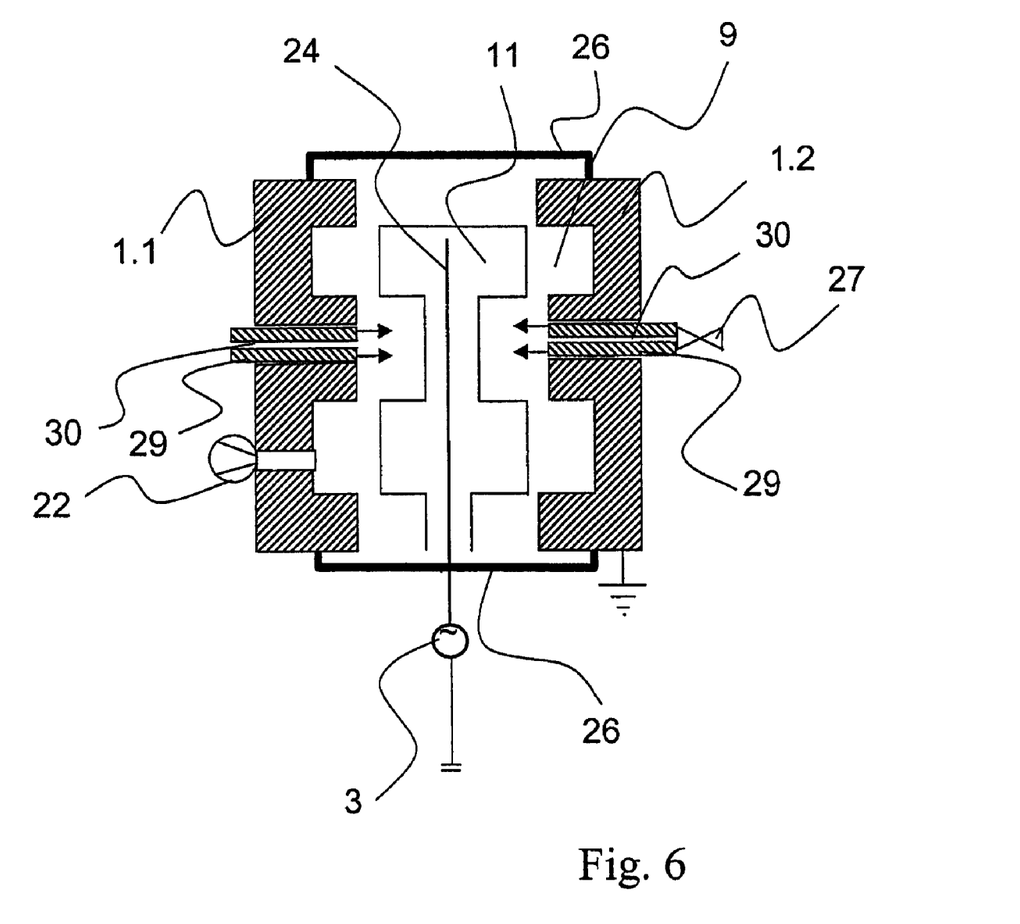

FIG. 6 diagrammatically depicts an embodiment of the apparatus according to the invention with ejector elements which have a passage for the introduction of process gas.

Two ejector elements 29 are integrated in the mold 1.1, 1.2. To eject the molding 11, the ejector elements 29 can be moved inward. The vacuum chamber 9 can be evacuated by means of a pump 22 and this pump 22 can also be used to pump out process gas which is produced during the coating operation. Process gas for external coating can be admitted by means of a valve 27 which is connected to one of the ejector elements 29. The vacuum chamber 9 is closed by one or more encircling sealing elements 26. As in the exemplary embodiment shown in FIG. 5, the plasma is ignited by application of an HF AC voltage 3 to an antenna 24 which leads into the molding 11. In an alternative embodiment, it is also conceivable for the passages 30 in the ejector elements 29 to be used to introduce microwaves in order for the plasma to be ignited in this way.

Figure 7:
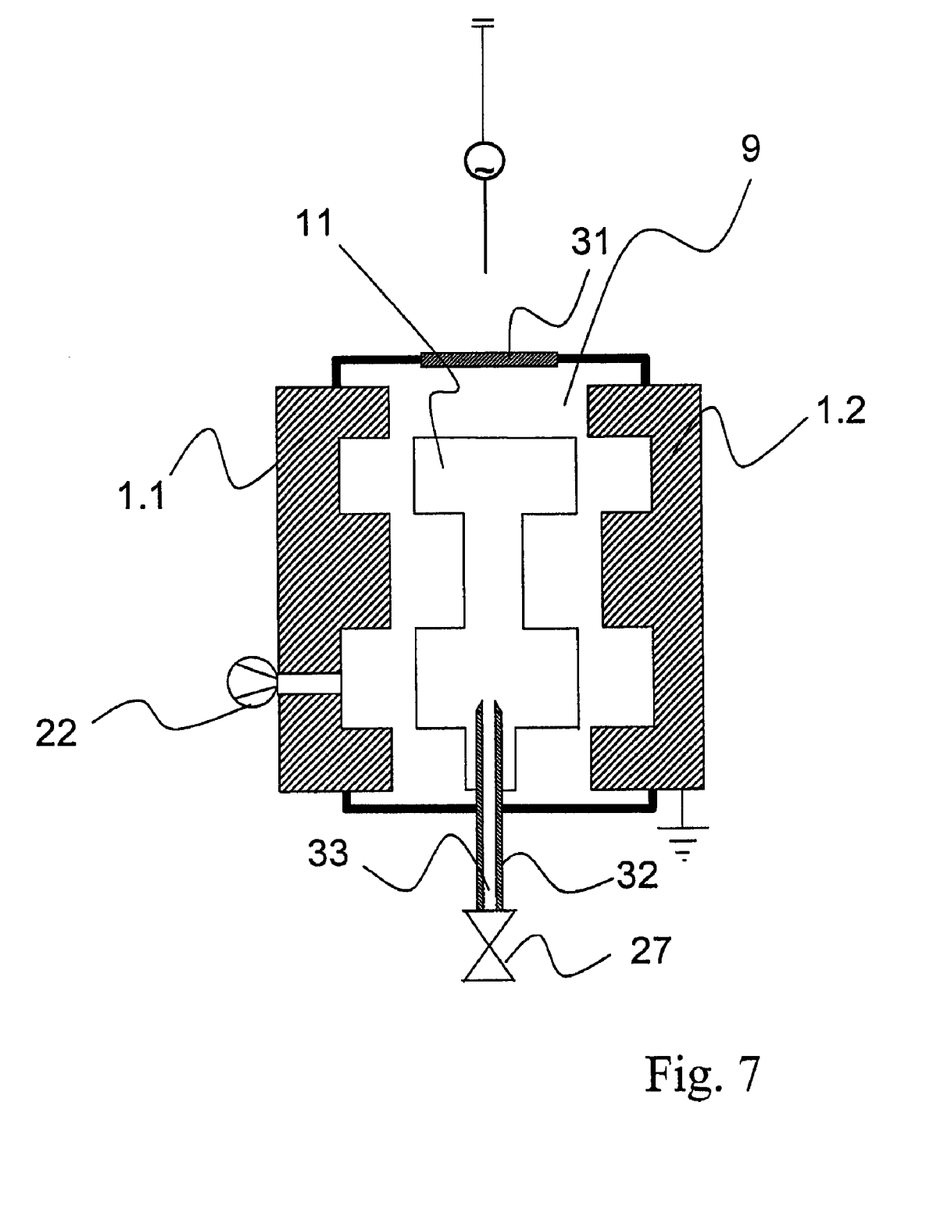
FIG. 7 shows an embodiment in which microwaves are introduced through a dielectric window, FIGS. 8A to 8C use a further embodiment of the invention to illustrate the process steps involved in production of a solid, coated body.

In an appropriate embodiment, the antenna 24 can also be used as a gas lance in order to introduce process gas into the hollow body. Moreover, in an apparatus which is suitable for stretch blow molding of hollow bodies, the antenna can simultaneously serve as a stretching lance. FIG. 7 shows a variant of the embodiment of an apparatus according to the invention which is shown in FIG. 6. In this embodiment, microwaves are introduced into the vacuum chamber 9, which is formed from the mold halves 1.1 and 1.2 and the sealing element 26, through a dielectric window 31 which is arranged on the sealing element 26.

Process gas for internal coating of the hollow body 11 is passed into the evacuated interior of the hollow body 11 by means of a gas lance 32 and a valve 27 connected to it, with a pulsed plasma being generated in the interior of the hollow body under the action of pulsed microwaves which are passed into the evacuated region between the mold halves 1.1 and 1.2 through the dielectric window 31, the reaction products of the plasma producing a coating on the inner surface of the hollow body.

In this case too, the gas lance can simultaneously serve as a stretching lance for a correspondingly designed apparatus for producing injection stretch blow molded hollow bodies.

Figure 8A:
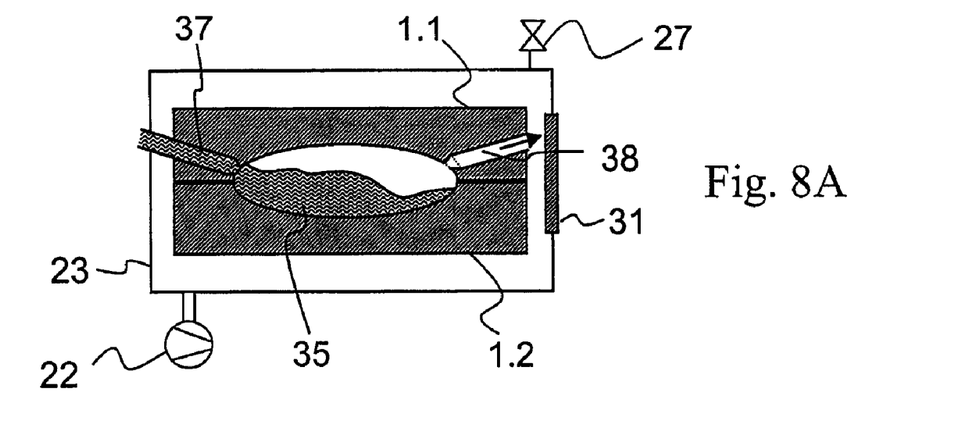
Figure 8B:
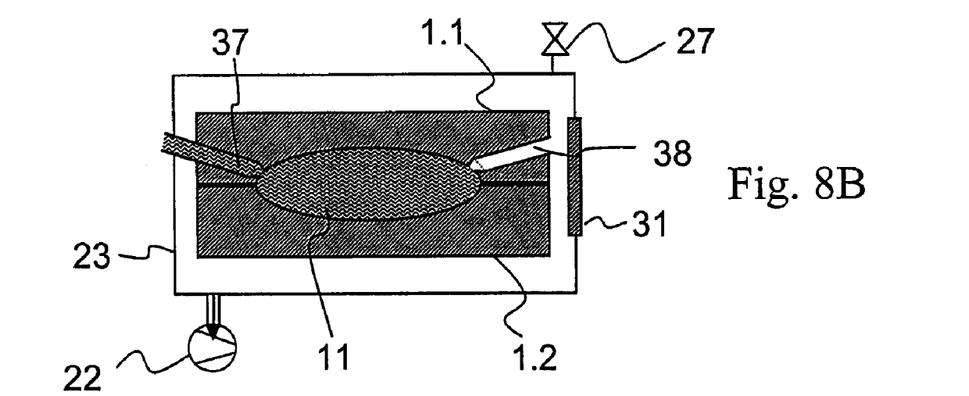
Figure 8C:
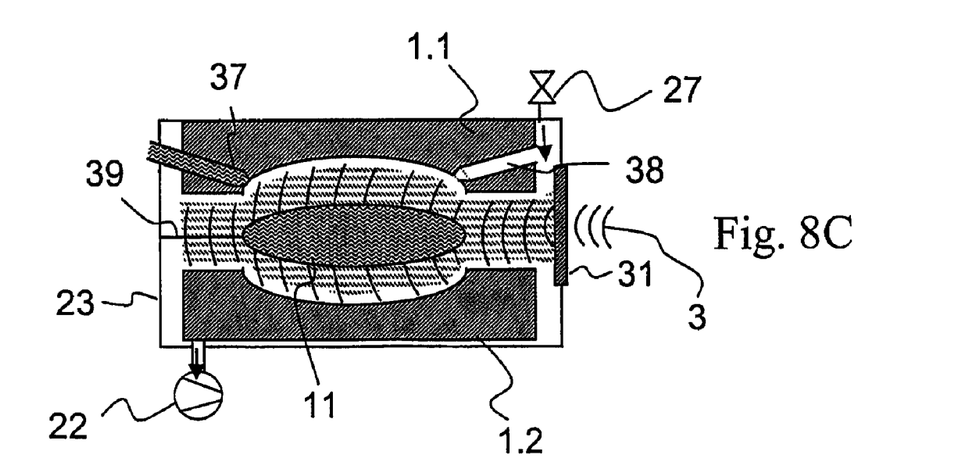

FIGS. 8A to 8C illustrate the process steps according to the invention for producing a coated body. In this embodiment of the invention, the body is not hollow, but rather is solid. The process steps are illustrated by way of example for the production of an optical element, and in the specific case illustrated an optical lens.

First of all, injection-molding material 35 is injected between the mold halves 1.1 and 1.2, via a gate 37, into the negative mold defined between the mold halves 1.1 and 1.2, as illustrated with reference to FIG. 8A. A ventilation passage 38 is used to discharge air which has been displaced in the negative mold.

In a further step, which is shown in FIG. 8B, the finished molding 11, or in this case the fully molded lens, is solidified, for example by cooling the injection-molding material. The chamber 23 is then evacuated and the two mold halves 1.1 and 1.2 can be moved apart by a predetermined distance, as shown in FIG. 3C. To make the surface of the lens accessible from all sides, it can be held using a holder 39, so that it does not rest on any of the mold halves. When the container 23 has been evacuated to the required base pressure by means of the pump 22, process gas can be admitted to the container 23 via a valve 27.

Then, pulsed microwaves 3 are radiated into the container 23 in order to coat the lens, so that a pulsed plasma is generated around the lens 11. These microwaves can be introduced, for example, via a dielectric window 31. However, it is also equally possible, for example, to apply an AC voltage between the mold halves and in this way to generate an AC field between the mold halves. It is preferable for relatively low frequencies in the high-frequency range to be used for this purpose. After coating of the lens 11 has been completed, the container 23 can then be opened and the lens removed.

Coatings which can be applied for optical elements, such as for example the lens described here by way of example, include a refractive index adjuster, an antireflection coating and/or a nonscratch coating and/or a barrier coating. Accordingly, the products can be provided with high-quality coatings and/or functional optical layers directly during production. It is not only plastics which can be used as the injection-molding material. Rather, this process can also be used for the casting and coating of glass products. For optical elements, barrier coatings can act as a water vapor barrier to protect the coating or the plastic, or as a barrier against fats and greases, for example in the case of optical elements made from COC. COC has a good barrier action against water vapor, and this is reinforced by the layer. However, unprotected COC, on the other hand, is attacked by greases and fats, for example by fingerprints.

With the apparatus according to the invention and the process according to the invention, it is possible simultaneously to produce a plastic body of any desired shape and to provide it with a coating. The advantage of a procedure of this nature is in particular the efficient production of coated moldings. The process according to the invention or the apparatus according to the invention, compared to the injection blow molding technique described in WO 99/17334, can also be used to produce complex moldings by injection molding. Furthermore, it is possible for the mold halves of the mold to be cleaned with the aid of a plasma after the moldings have been removed.

The invention claimed is:

1. A process for simultaneously coating and molding a hollow body within the same apparatus, comprising:
    moving two mold halves of a mold into contact with one another;
    introducing an injection-molding material into the two mold halves so that the hollow body is formed;
    moving the two mold halves away from one another a predetermined distance so that a vacuum chamber is formed;
    evacuating the hollow body and the vacuum chamber;
    admitting a gas comprising a gas atmosphere and a precursor gas into the hollow body only; and
    igniting a plasma in the hollow body so that a coating is deposited only on an inner side of the hollow body.

2. The process as claimed in claim 1, further comprising moving the two mold halves apart so that the hollow body drops out.

3. The process as claimed in claim 1, further comprising introducing microwaves to ignite the plasma.

4. The process as claimed in claim 1, wherein the plasma is ignited by high-frequency AC voltage or microwaves which are introduced by an antenna positioned in the hollow body so as to generate a cylinder-symmetrical field.

5. A process for simultaneously coating and molding a hollow body within the same apparatus, comprising:
    producing a parison;
    stretch-blow-molding the parison to form the hollow body;
    cooling the hollow body;
    filling the hollow body with a gas; and
    igniting a plasma in the hollow body to deposit a coating only on an inner side of the hollow body, wherein the step of stretch-blow-molding comprises stretching the parison with a gas lance, wherein the step of filling the hollow body comprises filling the gas into the hollow body through the gas lance, and wherein the step of igniting the plasma comprises introducing high-frequency AC voltage or microwaves from an antenna positioned in the hollow body and generating a cylinder-symmetrical field, wherein the antenna serves as the stretching lance.

6. The process as claimed in claim 5, further comprising pulsing the microwaves or high-frequency AC voltage to ignite the plasma.

7. A process for simultaneously coating and molding a hollow body within the same apparatus, comprising:
    filling a mold with molten material;
    expelling excess molten material by means of gas or liquid to form the hollow body;
    evacuating the hollow body;
    filling the hollow body and/or a vessel which surrounds the hollow body with a gas; and
    igniting a plasma in the hollow body and/or the vessel to apply a coating on an inner side and/or an outer side of the hollow body, wherein the step of igniting the plasma comprises introducing microwaves or high-frequency AC voltage from an antenna positioned in the hollow body and generating a cylinder-symmetrical field.

8. The process as claimed in claim 7, further comprising pulsing the microwaves or high-frequency AC voltage to ignite the plasma.

9. The process as claimed in claim 8, further comprising controlling the high-frequency AC voltage and/or the microwaves so that the coating is formed only on the inner side of the hollow body.

10. The process as claimed in claim 7, further comprising stretching the hollow body with a stretching lance having a gas passage, wherein the hollow body is filled with the gas through the gas passage.

11. The process as claimed in claim 10, wherein the gas comprises a precursor gas.

12. The process as claimed in claim 11, wherein the precursor gas comprises a substance selected from the group consisting of HMDSN, HMDSO, TMS, silane in $N_2$, $TiCl_4$, and any combinations thereof.

13. The process as claimed in claim 10, wherein the gas comprises a gas atmosphere selected from the group consisting of an $O_2$ atmosphere, an $N_2$ atmosphere, an $N_2+NH_3$ atmosphere, and any combinations thereof.

14. The process as claimed in claim 7, wherein the step of expelling excess molten material by means of gas or liquid to form the hollow body comprises filling the gas or liquid into the hollow body through a stretching lance, wherein the antenna serves as the stretching lance.

15. An apparatus for simultaneously coating and molding a hollow body within the same apparatus, comprising:
  a mold for forming the hollow body, said mold comprising two mold halves;
  a first feed line for injection-molding material into the mold to form the hollow body;
  a second feed line for evacuating a vacuum chamber formed in the mold and/or the hollow body, said vacuum chamber being formed when said two mold halves are a predetermined distance away from each other;
  a third feed line for feeding gas only into the hollow body; and
  one or more ignition devices comprising high-frequency AC voltage or microwave antenna positionable in the hollow body for igniting the gas and generating a cylinder-symmetrical field, wherein the one or more ignition devices are configured to ignite the gas to form the coating only on an inner side of the hollow body.

16. The apparatus as claimed in claim 15, further comprising at least one ejector element having at least one passage for the introduction of process gas and/or microwaves.

\* \* \* \* \*